United States Patent
Yao

[15] 3,663,211
[45] May 16, 1972

[54] SILVER HALIDE EMULSIONS CONTAINING UNSYMMETRICAL TRIMETHINE SENSITIZING DYES

[72] Inventor: Shi-Kuang Yao, Binghampton, N.Y.
[73] Assignee: GAF Corporation, New York, N.Y.
[22] Filed: July 2, 1969
[21] Appl. No.: 838,709

[52] U.S. Cl. ..............................96/138, 96/137, 260/240.6
[51] Int. Cl. ...........................................................G03c 1/10
[58] Field of Search ..................................96/106, 137, 138

[56] References Cited

UNITED STATES PATENTS

| | | | |
|---|---|---|---|
| 2,945,763 | 7/1960 | Jones | 96/106 |
| 3,177,210 | 4/1965 | Rosenoff | 96/106 |
| 3,264,110 | 8/1966 | Depoorter et al | 96/106 |
| 3,428,455 | 2/1969 | Kitze | 96/106 |

FOREIGN PATENTS OR APPLICATIONS 505,979   5/1939   Great Britain ..........................96/106

*Primary Examiner*—J. Travis Brown
*Attorney*—George L. Tone, Samson B. Leavitt, Homer J. Bridger and Martin A. Levitin

[57] ABSTRACT

The instant invention is directed to carbocyanines having the following formula:

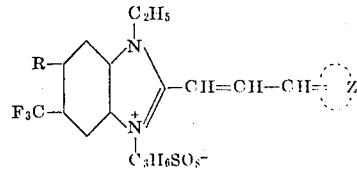

wherein R represents halogen, hydrogen or cyano and Z represents the following radicals

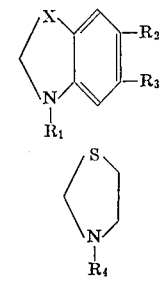

in which X is selected from the group consisting of oxygen and sulphur atoms, $R_1$ and $R_4$ represent lower alkyl radicals or benzyl, and $R_2$ and $R_3$ represent lower alkyl radicals, halogen radicals, or hydrogen. In addition the instant invention is directed to the use of the above dyestuffs for second order sensitization of photographic emulsions.

14 Claims, No Drawings

SILVER HALIDE EMULSIONS CONTAINING UNSYMMETRICAL TRIMETHINE SENSITIZING DYES

The instant invention is directed to a new class of carbocyanine dyestuffs. In particular the instant invention is directed to thiazolinocyanine and oxacarbocyanines which are particularly useful for the second order sensitization of photographic emulsions.

I have found a new class of cyanine dyes containing at least one benzimidazole nucleus wherein at least one of the hydrogen atoms of the benzene ring forming part of said benzimidazole nucleus is substituted by a trifluoro-methyl substituent.

More particularly, I have found a new class of trimethine dyestuffs represented by the general formula

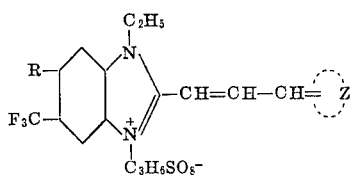

wherein R represents halogen, hydrogen or cyanine and Z represents the following radicals

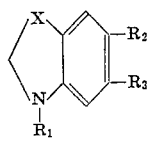

in which Z is selected from the group consisting of oxygen and sulfur atoms, $R_1$ and $R_4$ represent lower alkyl radicals or benzyl, and $R_2$ and $R_3$ represent lower alkyl radicals, halogen radicals, or hydrogen.

According to the instant invention the subject compounds disclosed above are prepared from a starting material having the following formula

III

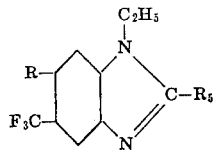

wherein R is as defined above and $R_5$ represents an alkyl radical. The compounds represented by formula III above are prepared in general by the reaction of a halo-nitrobenzotrifluoride with ethylamine a catalyst and hydrazine hydride so as to form the desired product. That is to say that the compounds represented by the above formula may in general be prepared according to the following reaction scheme:

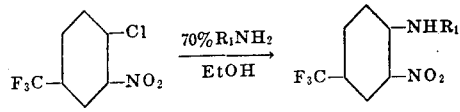

4-chloro-3-nitrobenzo-trifluoride may be reacted with an appropriate alkyl or aryl amine so as to form the appropriate N-substituted 4-trifluoromethyl-2-nitro-aniline derivative. This nitro-aniline derivative may then be reacted with an appropriate catalyst in a solvent system and, subsequently treated with acid anhydride to form the desired 2-substituted-5-trifluoromethyl-benzimidazole according to the following equations:

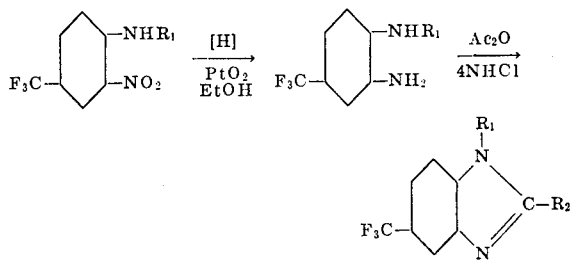

The free-base, i.e., 1,2 substituted 5-trifluoromethyl benzimidazole may then be nitrated, reduced, and reacted by means of Sandmeyer's reaction so as to form the appropriate halo-derivative according to the following equations:

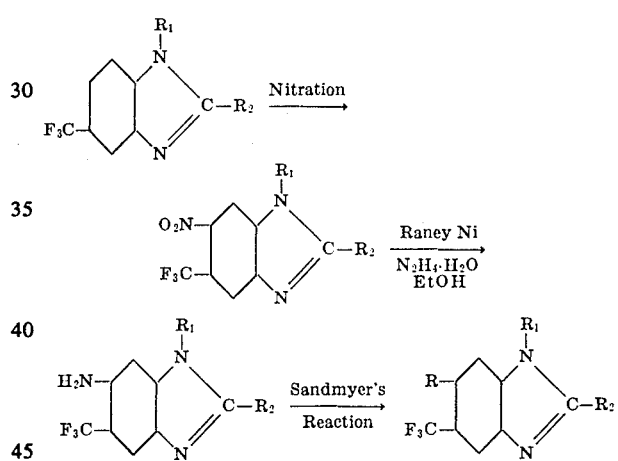

The above reactions may be advantageously carried out in the presence of an inert solvent such as a lower alkanol such as, for example, methanol, ethanol, isopropanol, etc., or in the presence of aromatic organic solvents such as dioxane, benzene, toluene, etc. In general, the above reactions may be carried out at temperatures ranging from about 20° to about 150° C. and, preferably, in the range from about 30° to 100° C., by reacting appropriate amounts each of the individual ingredients.

The desired end products may be isolated from the reaction mixture by conventional means such as, for example, by dilution of said reaction mixture with water followed by the adjustment of the pH of the solution and the isolation of the precipitate or solid so formed. The compound may be further purified by procedures such as, for example, re-crystallization.

The catalyst which may be suitably employed in connection with the instant invention and in particular the catalysts which may be employed for the reduction of n-alkyl-4-trifluoromethyl-2-nitroaniline include platinum, palladium and nickel catalysts such as the oxides or the catalytically reactive combinations of said metals.

The specific halogen derivative produced, i.e., chloro-, bromo-or fluoro-derivative is determined by the materials employed in the Sandmeyer reaction. As is well known in the art, the Sandmeyer reaction is one in a diazonium group in an aromatic compound is replaced by halogen radicals under the catalytic influence of the copper salts. Therefore, if one employs copper chloride one would obtain the corresponding chloro-derivative as a result of this reaction. In a similar manner, one may employ copper bromide, copper iodide and the like. In addition, the reaction may also take place by the reaction of the corresponding diazonium with cuprous or cupric salt catalyst.

The sulfopropyl-benzimidazolium salt of the above compound is prepared by reaction of the benzimidazole base with 1,3-propane sultone. The reaction product, i.e., the 3-sulfopropylbenzimidazolium salt can be separated from the above reaction mixture by conventional means such as treatment with acetone and ether.

The benzimida-thiazolino-carbocyanines of the instant invention can then be prepared by reaction of the 3-sulfopropyl-benzimidazolium salt with 2-anilinovinyl-3-alkyl-thiazolinium iodide in a solvent such as pyridine. The reaction mixture is heated to a constant temperature of from about 100° to 150° C. subsequent to which acetic anhydride is added to the mixture. Triethylamine is then added to the mixture and the reaction is refluxed for approximately 2 hours. The reaction mixture is then cooled and the desired benzimida-thiazolino-carbocyanine is treated by conventional means such as solvent washing.

The desired benzimida-oxa-carbocyanines can be prepared by the reaction of the 3-sulfopropylbenzimidazole salt with acetanilinovinyl-3-alkyl-benzoxazolium salt under the conditions described in connection with the reaction for the formation of benzimida-thiazolino-carbocyanine.

The new cyanine dyestuffs of the instant invention have been found to sensitize silver halide emulsions when incorporated therein. Although the new cyanine dye salts are useful especially for extending the spectral sensitivity of the customarily employed gelatino-silver chloride, gelatino-silver chloro-bromide, gelatino-silver bromide, gelatino-silver bromo-iodide and gelatino-silver chloro-bromo-iodide emulsions, photographic emulsions containing water-permeable colloids other than gelatin, such as agar-agar, zein, collodion, water-soluble cellulose derivatives, polyvinyl alcohol or other hydrophilic synthetic or natural resins or polymeric compounds, may equally well be sensitized according to the present invention.

To prepare photographic emulsions sensitized according to the invention with one or more of the new carbocyanine dyes, the compound can be incorporated in the photographic emulsion by one of the methods customarily employed in the art. In practice, it is convenient to add the carbocyanine compounds to the emulsion in the form of a solution in an appropriate solvent. The carbocyanine compounds are advantageously incorporated in the finished, washed emulsions and should be uniformly distributed throughout the emulsion. The concentration of the dye salts in the emulsion can vary widely, for example from 1 to 100 mg. per kg. of flowable emulsion and will vary according to the effect desired. The suitable and most economical concentration for any given emulsion will be apparent to those skilled in the art, upon making the ordinary tests and observations customarily used in the art of emulsion making.

The new carbocyanine compounds can be incorporated into photographic emulsions the general sensitivity of which has been increased by physical and chemical ripening. As suitable chemical sensitizers may be mentioned the well known sulphur sensitizers such as allylisothiocyanate, allythiourea, sodium thiosulphate, potassium selenocyanide and the natural sensitizers originating in the gelatin, reducing sensitizers such as the imino-aminomethane sulphinic acid and the derivatives thereof, and the salts of noble metals such as gold, platinum and palladium.

The photographic emulsions optically sensitized according to the invention may further be supersensitized and/or hypersensitized by one of the methods known to those skilled in the art.

In preparing the photographic emulsions according to the invention, the usual and suitable addenda such as antifogging agents, stabilizers, antibronzing agents, hardeners, wetting agents, plasticizers, development accelerators, color couplers, fluorescent brighteners and ultraviolet screening compounds can moreover be incorporated in the emulsion in the manner customarily employed in the art. In this respect it may be mentioned that the sensitivity of the silver halide emulsions sensitized according to the process of the present invention is not adversely affected but rather enhanced by the presence therein of certain fluorescent compounds. Another advantage of the process for sensitizing silver halide emulsions according to the present invention is the compatibility of the new carbocyanine compounds with anionic wetting agents and with color couplers, which is of great importance in the application of the carbocyanine compounds for sensitizing the silver halide emulsions of a light-sensitive element for color photography.

It is also noted that the dyestuffs of the instant invention have been found to be particularly useful in connection with silver halide emulsions in lipophilic systems wherein said dyestuffs have been found to exhibit very strong second-order sensitization. It is believed because of the nature of color emulsions especially those incorporating color formers dispersed in non-ionic media, that it is very hard to sensitize the same. Therefore, this response as noted above in lipophilic systems makes the carbocyanine compounds of the instant invention even more useful as sensitizers in magenta layer in color emulsions.

Emulsion sensitized with the compounds of the instant invention can be coated in the usual manner on a suitable support such as glass, cellulose, derivative film, resin film, or paper.

All of the compounds of the instant invention have been tested extensively in different available emulsions and all have shown a unique response in sensitization with second order. The sensitization peak for each of the compounds ranges from about 515 m$\mu$ to 565 m$\mu$ which makes said compounds extremely desirable in photographic products both in papers and films.

The instant invention will now be illustrated by the following more detailed examples, it is to be noted, however, that the instant invention is not deemed as being limited thereto.

EXAMPLE 1

This example is directed to the preparation of N-ethyl-4-trifluoromethyl-2-nitro-aniline. 194.3 grams (0.865 mole) of 4-chloro-3-nitrobenzotrifluoride were added dropwise into 156 grams (3.46 moles) of 70 percent ethylamine with stirring. After the addition of ethylamine, the reaction mixture was stirred for 30 minutes before it was heated on a steam bath for an additional hour. The mixture was then poured into two volumes of ice water, filtered after 20 minutes of standing and washed well with water. The yellow solid was crystallized from aqueous ethyl alcohol. There was obtained 163.2 grams (79.3 percent yield) of N-ethyl-4-trifluoromethyl-2-nitro-aniline as orange plates melted at 59°–60° C. As a result of this reaction the N-ethyl-4-trifluoromethyl-2-nitro aniline was formed.

EXAMPLE 2

This example is directed to the preparation of N-ethyl-4-trifluoromethyl-o-phenylene-diamine. 70.2 g (0.3 mole) of N-ethyl-4-trifluoromethyl-2-nitroaniline in 900 ml. of 95 percent ethyl alcohol were mixed with 6.0 g. of pd-C in a 3-liter 3-necked round bottom flask equipped with a long bulb-type condenser, mechanical stirrer and dropping funnel. There was added dropwise (cautiously) 180 ml of 85 percent hydrazine hydrate and the reaction mixture was then heated on a steam bath with stirring for 2 hours. The mixture was filtered hot and the filtrate was poured into 3.0 l. of water. The white solid was filtered after cooling, washed with water and air-dried. There was obtained 54.32 g. (88.7 percent yield) of N-ethyl-4-trifluoromethyl-o-phenylenediamine as light tan powder melting at 75°–77° C. A 7 percent loss would have to take on the purification of the crude product with aqueous ethanol and charcoal as tannish white powder melting at 75°–77° C. As a result of this reaction the N-ethyl-4-trifluoromethyl-o-phenylene-diamine was formed.

EXAMPLE 3

This example is directed to the preparation of 1-ethyl-5-trifluoromethyl-2-methylbenzimidazole. 46.80 g. (0.2 mole) of N-ethyl-4-trifluoromethyl-2-nitroaniline in 200 ml. of benzene were hydrogenated on 6.00 g. of Pd-C until there was no more hydrogen absorbed (approximately 1 hour). The catalyst was filtered off and the filtrate was transferred to a 1-liter 3-necked round-bottom flask equipped with a mechanical stirrer, condenser and dropping funnel. There was added portionwise 34.8 ml. of acetic anhydride and the mixture was heated on a steam bath for 20 minutes. 84 ml. of 4N hydrochloric acid were added cautiously in portions and the reaction mixture was refluxed for 1½ hours (efficient stirring was necessary). The aqueous layer (bottom layer) was separated in a separatory funnel and the benzene layer was washed with water. The benzene layer was discarded and the combined aqueous layers were neutralized with 26 percent ammonium hydroxide. The solid after it cooled was filtered, washed well with water and dried in a 90° C. oven for 3 hours. There was obtained 41.31 g. (90.7 percent yield) of 1-ethyl-5-trifluoromethyl-2-methylbenzimidazole as light tan solid melted at 96°–98° C. As a result of this reaction the 1-ethyl-5-trifluoromethyl-2-methylbenzimidazole was formed.

EXAMPLE 4

The 1-ethyl-5-trifluoromethyl-2-methylbenzimidazole of Example 3 was reacted with 1,3-propane sultone to form the 3-sulfopropylbenzimidazolium salt. 10 millimols of the 1-ethyl-5-trifluoromethyl-2-methylbenzimidazole was reacted with 11 millimols of the 1,3-propane sultone, and the reaction mixture was heated to a constant temperature of approximately 114° C. for 50 minutes. The reaction mixture was cooled and triturated with acetone and ether mixture (1:3) twice and ether twice. The reaction resulted in 1-ethyl-5-trifluoromethyl-3-sulfopropyl-2-methylbenzimidazolium salt.

EXAMPLE 5

The procedure of Example 4 was repeated using as a starting material in lieu of 1-ethyl-5-trifluoromethyl-2-methylbenzimidazole, 6-chloro-1-ethyl-5-trifluoromethyl-2-methylbenzimidazole, 6-cyano-1-ethyl-5-trifluoromethyl-2-methylbenzimidazole, respectively, to form the corresponding 3-sulfopropyl-benzimidazolium salt thereof.

EXAMPLE 6

Two millimols of 6-chloro-1-ethyl-5-trifluoromethyl-3-sulfopropyl-2-methylbenzimidazolium salt was reacted with 1.75 millimols of 2-anilinovinyl-3-ethylthiazolinium iodide in 4 ml. of pyridine. The reaction mixture was heated to reflux in a constant temperature bath at a temperature approximately 131° C. To the reaction mixture there was added 0.4 ml. of acetic anhydride and the mixture was heated for a period of approximately 1 minute prior to the addition of 0.8 ml. of triethylamine. The reaction mixture was refluxed for 2 hours. After cooling, the reaction mixture was diluted with ether and the dye was boiled twice with isopropyl alcohol. Subsequent to the boiling treatment a carbocyanine having the formula

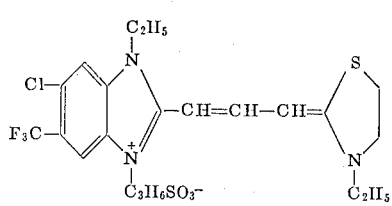

by solvent recrystallization with methyl cellosolve. The compound λ max (methyl alcohol): 473 millimicrons.

EXAMPLE 7

The procedure of Example 6 was repeated with the exception that 2-anilinovinyl-3-methylthiazolinium iodide was employed in lieu of 2-anilinovinyl-3-ethylthiazolinium iodide. In addition, methyl alcohol was employed in lieu of methyl cellosolve during the solvent recrystallization to form a product having the formula

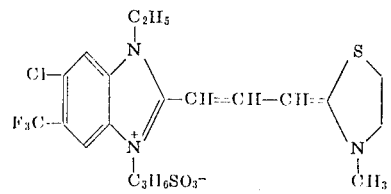

which had a λ max in methyl alcohol of 471 millimicrons.

EXAMPLE 8

The procedure of Example 6 was repeated with the exception that in lieu of 2-anilinovinyl-3-ethylthiazolinium iodide, 2-acetanilinovinyl-3-methylbenzoxazoliumiodide was reacted. Upon purification with methyl cellosolve, a compound having the formula

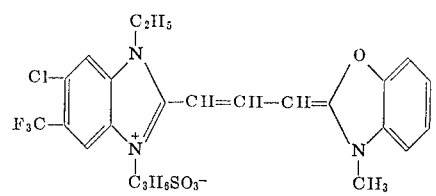

was recrystallized which compound having a λ max in methyl alcohol 487 millimicrons.

EXAMPLE 9

The procedure of Example 8 was repeated with the exception that instead of 2-acetanilinovinyl-3-methylbenzoxazolium iodide, 2-acetanilinovinyl-3-ethyl-5,6-dimethylbenzoxazollium iodide was employed. Upon recrystallization from methanol the compound having the formula

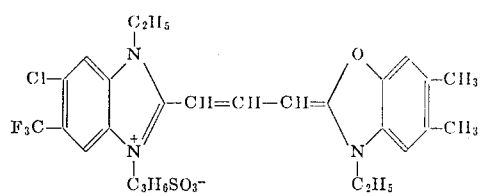

was found to have a λ max in methyl alcohol of 497 mμ.

EXAMPLE 10

2 mmols of 1-ethyl-5-trifluoromethyl-3-sulfopropyl-2-methylbenzimidazolium salt and 1.75 millimols of 2-acetanilinovinyl-3-ethyl-benzoxazolium iodide were reacted as in Example 6. Upon recrystallization from pyridine and water a compound having the formula

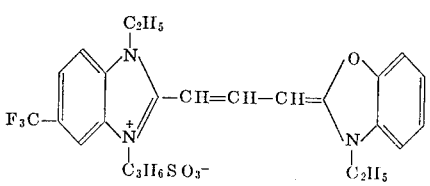

was found to have a λ max in methyl alcohol of 482 millimicrons.

EXAMPLE 11

The procedure of Example 10 was repeated with the exception that in lieu of 2-acetanilinovinyl-3-ethylbenzoxazolium iodide, 2-acetanilinovinyl-3-methylbenzoxazolium iodide was employed. Upon recystallization from isopropyl alcohol a compound having the formula

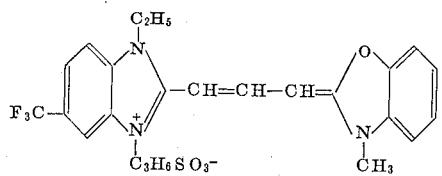

was found to have a λ max of 480 millimicrons in methyl alcohol.

EXAMPLE 12

The procedure of Example 11 was repeated with the exception that in lieu of 2-acetanilinovinyl-3-methylbenzoxazolium salt, 2-acetanilinovinyl-6-chloro-3-methylbenzoxazolium iodide was employed. Upon recrystallization from methyl cellosolve, a compound having the formula

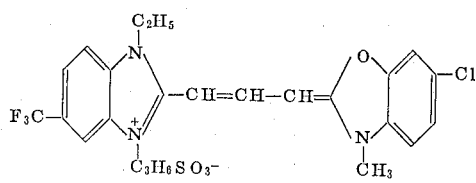

was found to have a λ max in methyl alcohol of 480 millimicrons.

EXAMPLE 13

Two millimols of 6-cyano-1-ethyl-5-trifluoromethyl-3-sulfopropyl-2-methylbenzimidazolium salt and 1.75 millimols of 2-anilinovinyl-3-ethyl thiazolinium iodide were reacted in Example 6. Upon recrystallization from methanol and water, a compound having the formula

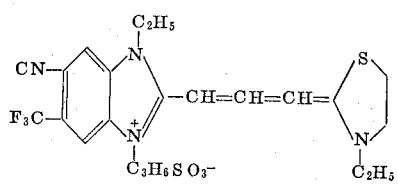

was found to have a λ max in methyl alcohol of 472 millimicrons.

EXAMPLE 14

The procedure of Example 13 was repeated with the exception that in Lieu of 2-anilino-3-ethyl-thiazolinium iodide, 2-anilinovinyl-3-methyl-thiazolinium iodide was employed. Upon recrystallization from methyl cellosolve and water a compound having the formula

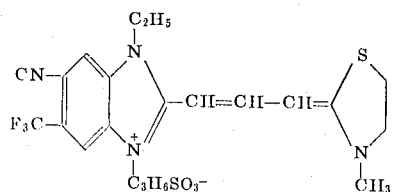

was found to have a λ max in methyl alcohol of 471 millimicrons.

EXAMPLE 15

The procedure of Example 13 was repeated with the exception that in lieu of 2-anilinovinyl-3-ethyl-thiazolinium iodide, 2-acetanilinovinyl-3-methylbenzoxazolium iodide was employed. Upon recrystallization from methyl cellosolve and water a compound having the formula

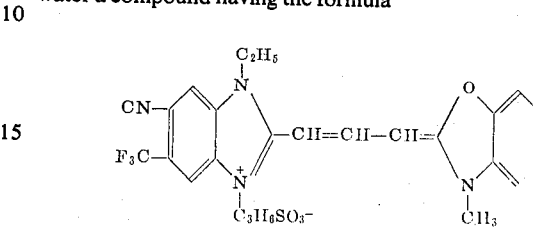

was found to have a λ max in methyl alcohol of 488 millimicrons.

EXAMPLE 16

Two millimols of 6-bromo-1-ethyl-5-trifluoromethyl-3-sulfopropyl-2-methylbenzimidazolium salt was reacted with 1.75 mmols of 2-anilinovinyl-3-ethyl-thiazolinium iodide as in Example 13. Upon recrystallization from pyridine, a compound having the formula

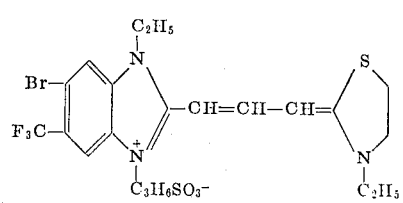

was found to have a λ max in methyl alcohol of 474 millimicrons.

EXAMPLE 17

The procedure of Example 16 was repeated with the exception that in lieu of 2-anilinovinyl-3-ethyl-thiazolinium iodide, 2-anilinvinyl-3-methyl-thiazolinium iodide was employed. Upon recrystallization from methyl cellosolve a compound having the formula

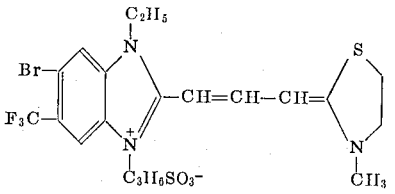

was found to have a λ max of 471 millimicrons in methyl alcohol.

EXAMPLE 18

The procedure of Example 16 was repeated with the exception that in lieu of 2-anilinovinyl-3-ethyl-thiazolinium iodide, 2-acetanilinovinyl-3-methylbenzoxazolium iodide was employed. Upon recrystallization from methyl cellosolve a compound having the formula

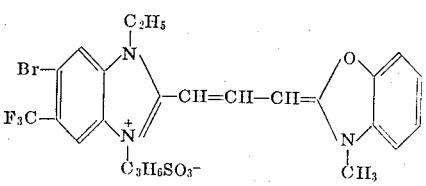

was found to have a λ max in methyl alcohol of 487 millimicrons.

EXAMPLE 19

The procedure of Example 16 was repeated with the exception that in lieu of 2-anilinovinyl-3-ethyl-thiazolinium iodide, 2-acetanilinovinyl-6-chloro-3-methylbenzoxazolium iodide was employed. Upon recrystallization from methyl cellosolve a compound having the formula

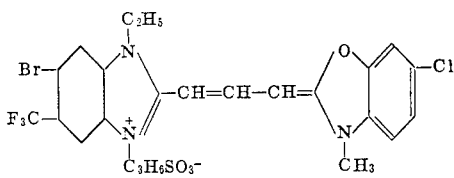

was found to have a λ max in methyl alcohol of 488 millimicrons.

EXAMPLE 20

The procedure of Example 19 was repeated with the exception that in lieu of 2-acetanilinovinyl-6- chloro-3-methyl-benzoxazolium iodide,2-acetanilinovinyl 3,5,6-trimethyl-benzoxazolium iodide was employed. Upon recrystallization from pyridine a compound having the formula

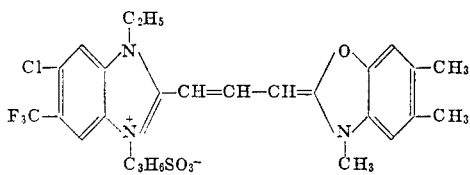

was found to have a λ max in methyl alcohol of 496 millimicrons.

EXAMPLE 21

The procedure of Example 16 was repeated with the exception that in lieu of 2-anilinovinyl-3-ethyl thiazolinium iodide, 2-acetanilinovinyl-6-chloro-a 3-methyl-benzoxazolium iodide was employed. Upon recrystallization from methyl cellosolve a compound having the formula

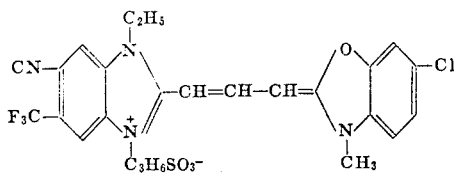

was found to have a λ max in methyl alcohol of 490 millimicrons.

EXAMPLE 22

The procedure of Example 16 was repeated with the exception that in lieu of 2-anilinovinyl-3-ethyl-thiazolinium iodide,2-acetanilinovinyl 5,6-dimethyl,3-ethyl-benzoxazolium iodide was employed. Upon recrystallization from methyl alcohol a compound having the following formula

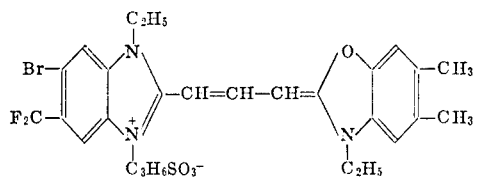

was found to have a λ max in methyl alcohol of 497 millimicrons.

EXAMPLE 23

The procedure of Example 6 was repeated with the exception that in lieu of 2-anilinovinyl-3-ethyl-thiazolinium iodide, 2-acetanilinovinyl-6-chloro-3-methyl-benzoxazolium iodide was employed. Upon recrystallization from methyl alcohol a compound having the formula

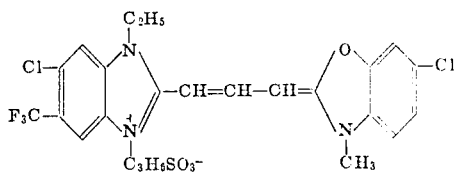

was found to have a λ max in methyl alcohol of 488 millimicrons.

What is claimed is:
1. A light-sensitive silver halide photographic emulsion containing a compound having the formula

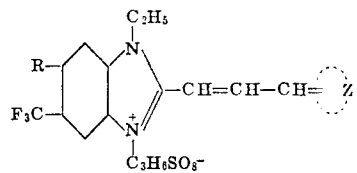

wherein R is selected from the group consisting of halogen, hydrogen or cyano and Z represents the radicals

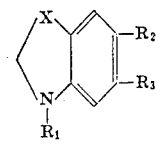

wherein X is selected from the group consisting of oxygen and sulphur atoms, $R_1$ and $R_4$ are selected from the group consisting of lower alkyl and benzyl, and $R_2$ and $R_3$ are selected from the group consisting of lower alkyl, halogen or hydrogen.

2. A light-sensitive silver halide photographic emulsion according to claim 1 wherein Z represents

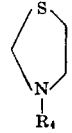

3. A light-sensitive silver halide photographic emulsion according to claim 2 wherein R represents chloro and $R_4$ represents ethyl.

4. A light-sensitive silver halide photographic emulsion according to claim 2 wherein R represents cyano and $R_4$ represents methyl.

5. A light-sensitive silver halide photographic emulsion according to claim 2 wherein R represents bromo and $R_4$ represents ethyl.

6. A light-sensitive silver halide photographic emulsion according to claim 1 wherein Z represents

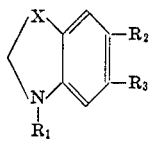

7. A light-sensitive silver halide photographic emulsion according to claim 6 wherein X represents oxygen, R represents chlorine, $R_1$ represents methyl and $R_2$ and $R_3$ represent hydrogen.

8. A light-sensitive silver halide photographic emulsion according to claim 6 wherein X represents oxygen, R represents chlorine, $R_1$ represents ethyl and $R_2$ and $R_3$ represent hydrogen.

9. A light-sensitive silver halide photographic emulsion according to claim 6 wherein R represents chlorine, $R_1$ represents ethyl, $R_2$ and $R_3$ represent methyl.

10. A light-sensitive silver halide photographic emulsion according to claim 6 wherein R represents hydrogen, $R_1$ represents ethyl, and $R_2$ and $R_3$ represent hydrogen.

11. A light-sensitive silver halide photographic emulsion according to claim 6 wherein R represents hydrogen, $R_1$ represents methyl, $R_2$ and $R_3$ represent hydrogen.

12. A light-sensitive silver halide photographic emulsion according to claim 6 wherein R represents cyano, $R_1$ represents methyl, $R_2$ and $R_3$ represent hydrogen.

13. A light-sensitive silver halide photographic emulsion according to claim 6 wherein R represents bromo, $R_1$ represents methyl, $R_2$ and $R_3$ represent hydrogen.

14. A light-sensitive silver halide photographic emulsion according to claim 6 wherein R represents chloro, $R_1$ represents methyl, $R_2$ represents chloro and $R_3$ represents hydrogen.

* * * * *